United States Patent
Bryan

[11] Patent Number: 5,732,616
[45] Date of Patent: Mar. 31, 1998

[54] DEVICE FOR SEPARATING MOIST, FATTY GROUND MEAT

[76] Inventor: Dick D. Bryan, 1 Pine Tree Rd., Castle Rock, Colo. 80104

[21] Appl. No.: 744,008

[22] Filed: Nov. 5, 1996

[51] Int. Cl.$^6$ .................. A23N 1/00; B26B 3/00
[52] U.S. Cl. .................. 99/495; 99/509; 30/303; 426/417; 426/518
[58] Field of Search .................. 99/495, 509, 537; 30/302, 303; 426/417, 518

[56] References Cited

U.S. PATENT DOCUMENTS

| | | |
|---|---|---|
| 293,542 | 2/1884 | Victor . |
| 342,353 | 5/1886 | Hand . |
| 452,789 | 5/1891 | Hutchinson . |
| 489,647 | 1/1893 | Coe ............... 30/303 X |
| 496,809 | 5/1893 | Allen . |
| 510,310 | 12/1893 | Avery ............... 30/303 |
| 534,728 | 2/1895 | Streeter . |
| 749,873 | 1/1904 | Meher . |
| 832,859 | 10/1906 | Hawk . |
| 983,969 | 2/1911 | Zahn . |
| 1,095,092 | 4/1914 | Drake . |
| 1,520,436 | 6/1924 | Peyton . |
| 1,581,310 | 3/1926 | Fetschan . |
| 2,072,793 | 11/1937 | Brennan . |
| 2,296,912 | 4/1942 | Erickson . |
| 2,928,483 | 7/1960 | Trost . |
| 3,709,273 | 1/1973 | Jaccard et al. . |
| 3,800,363 | 4/1974 | Lapeyre . |
| 3,900,919 | 8/1975 | Lekan et al. . |
| 3,980,235 | 9/1976 | Kuhlman . |
| 4,137,807 | 2/1979 | Schaumberg . |
| 4,152,963 | 5/1979 | Romanik et al. . |
| 4,169,300 | 10/1979 | McCullough . |
| 4,197,613 | 4/1980 | Whiteley . |
| 4,199,841 | 4/1980 | Jaccard . |
| 4,242,774 | 1/1981 | Massaro . |
| 5,446,965 | 9/1995 | Makridis . |

FOREIGN PATENT DOCUMENTS

| | | |
|---|---|---|
| 170009 | 9/1934 | Germany . |
| 602414 | 5/1948 | United Kingdom . |

Primary Examiner—Reginald L. Alexander
Attorney, Agent, or Firm—Donald W. Margolis; John L. Isaac

[57] ABSTRACT

A hand-operated device for separating moist, fatty ground meat while said meat is being cooked on a heated cooking surface. Said device includes an elongated handle having a distal blade attachment end and a proximal free end. Four non-metallic separating blades are provided with each having substantially parallel front and rear surfaces bounded by an inner side edge, an outer side edge, a top edge and a bottom edge. Said bottom edge is in said form of an angled surface. Said four blades are integrated at their inner side edges oriented at about right angles to each other to form an X or cross pattern. Each blade has a critical minimum thickness of at least 5/16 inch thick between said blade front and rear surfaces to ensure separation of said moist, fatty ground meat as said blade passes entirely through said meat, and to prevent reagglomeration of said separated moist, fatty ground meat as said blade is removed therefrom. Finally, a mechanism is provided for connecting said blade attachment end of said handle to said top edges of said blades at said intersection of their inner side edges.

18 Claims, 5 Drawing Sheets

5,732,616

DEVICE FOR SEPARATING MOIST, FATTY GROUND MEAT

BACKGROUND OF THE INVENTION

1. Field of the Invention

The present invention relates generally to the field of food product cutting devices and, more particularly, to devices for the separating of moist, fatty, already ground meat products such as moist, fatty ground beef, pork and poultry. More specifically, the present invention relates to a device for separating moist, fatty ground meat while that meat is being heated or cooked in a frying pan or on a griddle or other cooking surface.

2. Description of the Prior Art

In the art of food preparation, it is well known to use any number of tapered and sharply edged cutting implements, such as knives, to cut, chop or dice food products to achieve the desired sized portion for further preparation, handling, use or consumption. Such cutting implements have varied in complexity from as simple as a single knife blade to extremely large and complicated power cutting and shredding devices. Moreover, some of these complex cutting implements have also been used to cut or separate meat, including ground meat, but not during the process of cooking the meat.

Examples of large and complicated meat cutting, shredding and/or tenderizing devices are illustrated in U.S. Pat. Nos. 3,709,273; 3,800,363; 3,900,919; 3,980,235; 4,169,300 and 4,197,613. Such devices are generally quite complex and intended for commercial meat processing systems. Moreover, they are certainly not adaptable or even pertinent to meat cooking operations and the requirements associated therewith.

Hand held, multi-bladed chopping, cutting and tenderizing devices are also well known in the art for use with a wide variety of materials including vegetables, potatoes, meats, fruit and the like, and examples of such devices are taught in U.S. Pat. Nos. 293,542; 452,789; 496,809; 983,969; 1,095,092; 1,520,436; 1,581,310; 2,928,483; 4,199,841; 4,242,774 and U.K. Patent Specification 602,414. While such multi-bladed devices are adapted for hand operation in the cutting or tenderizing of various items including beef, they are not particularly adapted for use during ground meat cooking operations, but rather are adapted for use prior to cooking. Moreover, while such multi-bladed devices may be excellent cutting tools, they are not particularly suited for the separation of moist, fatty already ground meat into small particles which do not need cutting or chopping.

Separated ground meat is used in the preparation of various dishes, and is especially tasty in many ground meat dishes, including but not limited to sloppy Joe's and ethnic Mexican and Italian foods, and the like. Moist, fatty ground meat is not a solid piece of meat to begin with, but, because of its fat content and moisture, it has a tendency to agglomerate or stick together. As a result, maintaining portions of moist, fatty ground meat which have been separated from one another continuously separated from one another during cooking has been a problem. This is due to the fact that moist, fatty ground meat, during the process of cooking, has the tendency to come back together or re-agglomerate once thin metal chopping blades or standard metal knife blades have been removed from them. Thus, simply pressing a thin metal blade into ground meat will not keep the moist, fatty ground meat in a separated form. This is a problem because the maintenance of the separation of the moist, fatty ground meat is especially important during the process of cooking.

If a portion of the ground meat is not separated or re-agglomerates after it is separated, and if a portion of the ground meat is separated and does not re-agglomerate in other parts, the ground meat cooks in a non-uniform manner. Because of its relatively small surface area the non-separated or re-agglomerated portions of the moist, fatty ground meat take longer to cook, and as a result will tend to be underdone. Underdone ground meat can constitute a serious health hazard if the meat has been exposed to e. coli bacteria. On the other hand, if the meat is sufficiently cooked so that the non-separated or re-agglomerated portions are completely cooked, those portions which are separated will be over cooked and lose their flavor, and may even become hard and crunchy. Thus, the tendency of moist, fatty ground meat to re-agglomerate when trying to separate it is a problem which has not been previously overcome.

Thus, there is still a need for a device which is particularly adapted to separate moist, fatty ground meat, especially during cooking, in a manner which will prevent re-agglomeration of the moist, fatty separated pieces in order to promote uniform cooking of the ground meat segments.

SUMMARY OF THE INVENTION

It is one object of the present invention to provide a device for separating moist, fatty ground meat into successively smaller pieces while the meat is being cooked.

It is another object of the present invention to provide a device for separating moist, fatty ground meat during cooking which device prevents re-agglomeration of the separated pieces of meat.

Yet another object of the present invention is to provide a device for separating moist, fatty ground meat during cooking which reduces adhesion of the meat to the blades of the device during use.

To achieve the foregoing and other objects and in accordance with the purposes of the present invention as embodied and broadly described herein, a hand-operated device is disclosed for separating moist, fatty ground meat while the meat is being cooked in a frying pan or other cooking surface. The device includes an elongated handle having a distal blade attachment end and a proximal free end. In preferred embodiments at least four non-metallic separating blades in the form of an X or cross are provided. Each non-metallic blade has front and rear surfaces which are substantially parallel to one another, each blade being bounded by an inner side edge, an outer side edge, a top edge and a bottom edge. In preferred embodiments the bottom edge is angled, like a chisel. The four blades are integrated at their inner side edges oriented at about right angles to each other to form, as noted above in the form of an X or cross pattern. For the reasons detailed below, each blade is at least 5/16 inch thick between the blade front and rear surfaces to ensure separation of the moist, fatty ground meat as the blade passes through the meat, and to prevent re-agglomeration of the separated moist, fatty ground meat as the blade is removed therefrom. Finally, the blade attachment end of the handle is connected to or integral with the top edges of the blades at the intersection of their inner side edges.

These and other objects of the present invention will become apparent to those skilled in the art from the following detailed description, showing the contemplated novel construction, combination, and elements as herein described, and more particularly defined by the appended claims, it being understood that changes in the precise embodiments to the herein disclosed invention are meant to be included as coming within the scope of the claims, except insofar as they may be precluded by the prior art.

BRIEF DESCRIPTION OF THE DRAWINGS

The accompanying drawings illustrate complete preferred embodiments of the present invention according to the best modes presently devised for the practical application of the principles thereof, and in which.

DETAILED DESCRIPTION OF THE PREFERRED EMBODIMENT

Figure 1:
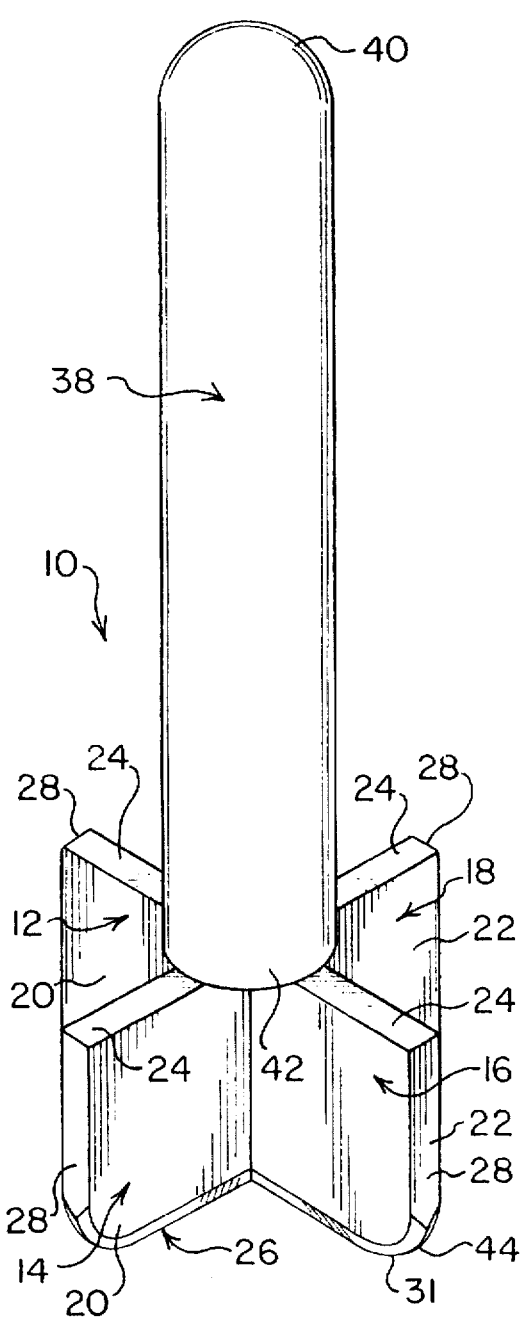
FIG. 1 is a front perspective view of a device constructed in accordance with the present invention.
Figure 2:
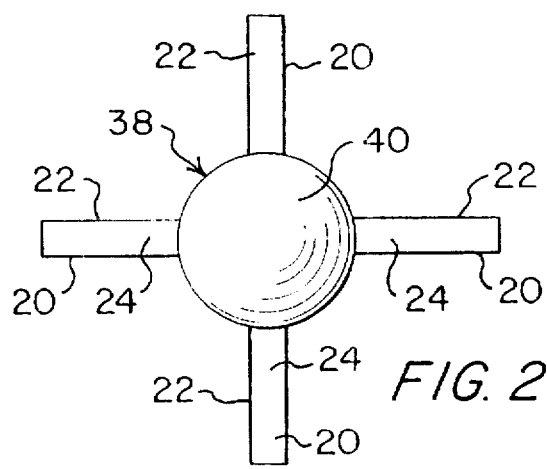
FIG. 2 is a top plan view of the device of FIG. 1.
Figure 3:
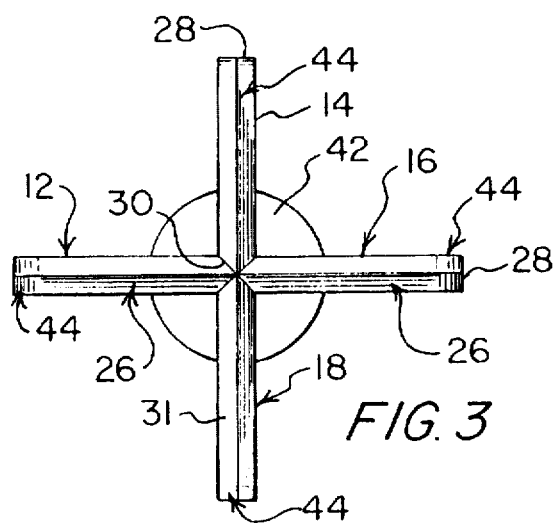
FIG. 3 is a bottom plan view of the device of FIG. 1.

Referring first to FIGS. 1–3, a device 10 for separating moist, fatty ground meat includes a plurality of non-metallic separating blades 12, 14, 16 and 18. Each of the non-metallic blades 12, 14, 16 and 18 are integral with one another, and each includes a front surface 20 and a rear surface 22. Each blade 12, 14, 16 and 18 also includes a top edge 24, a bottom edge 26 and a pair of side edges 28, 30. Blades 12, 14, 16 and 18 may be constructed from any desired material such as wood, thermoset plastic, or the like. In some environments, metal is the equivalent of such non-metallic materials, but should be avoided if the cooking utensil is coated with a non-stick plastic coating which could be nicked, scratched, or otherwise damaged by a metal blade.

In the embodiments illustrated in FIG. 3, blades 12, 14, 16 and 18 are interconnected at their inner side edges 30 so as to preferably orient the blades 12, 14, 16 and 18 at substantially right angles to each other to form an X or cross pattern. The ability of the present invention to keep the separated portions of moist, fatty ground meat from adhering to the sides of the blades 12, 14, 16 and 18 is partially accomplished by having only the single X or cross pattern of four blades. In devices having blades in excess of four, portions of the separated moist, fatty ground meat may be compressed and jammed or wedged into the spaces at the intersections of the blades. However, with the present invention, once the ground meat portions are separated they can freely move away from another without being wedged or jammed in the 90° spaces between the blades 12–14.

Figure 5:
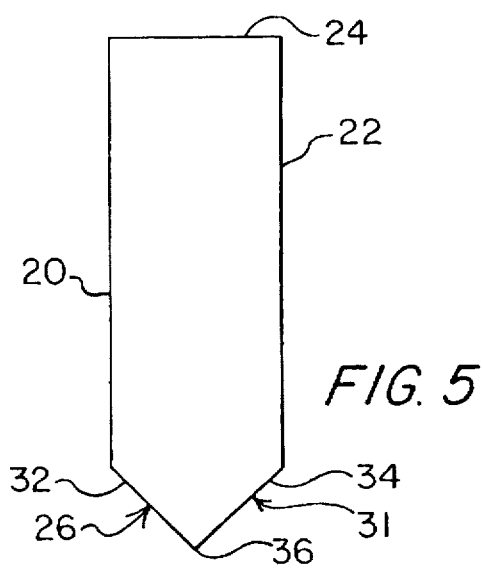
FIG. 5 is an enlarged cross sectional view taken substantially along line 5—5 of FIG. 4.
Figure 4:
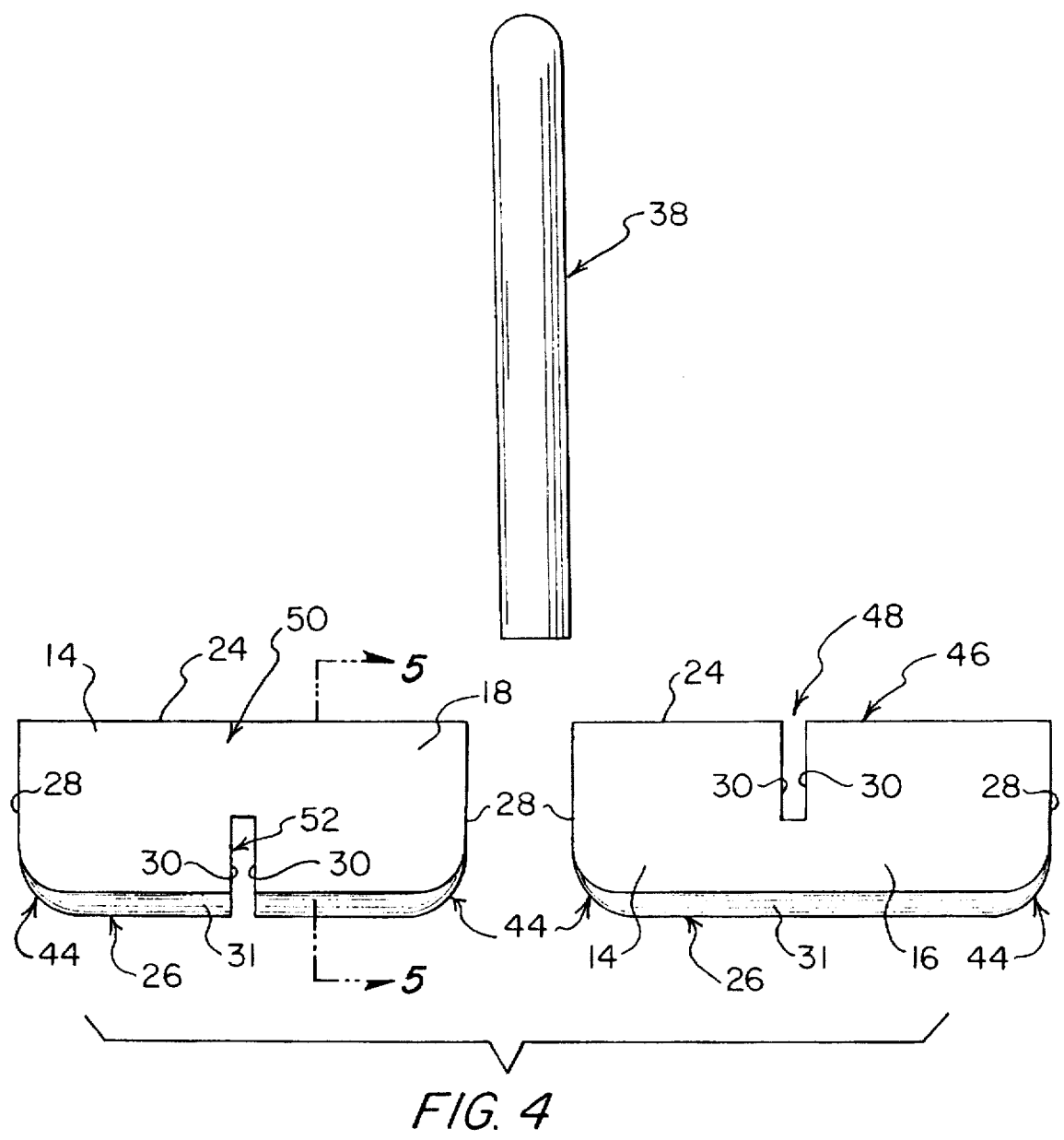
FIG. 4 is a schematic of one embodiment of the present invention with its component parts disassembled.

In preferred form, and referring particularly to FIGS. 1, 3 and 5, the bottom edge 26 of each of the blades 12, 14, 16 and 18 is preferably in a form of an angled chisel 31. The angled chisel edge 31 is created by a pair of tapered surfaces 32, 34 which depend 1 from the from surface 20 and rear surface 22, respectively, at an angle of approximately 45° so as to form a knife or chisel edge 36 with the tapered surfaces 32, 34 meeting at an angle of approximately 90°. The 45° angle of each surface 31 is the optima shape for separating moist, fatty ground meat, especially when taken in conjunction with the critical thickness of the blades 12, 14, 16 and 18 as discussed in greater detail below. Angled chisel edges 31 of greater or lesser than 45° may be used in the equivalent practice of the present invention.

The device 10 further includes an elongated handle 38 that has a free proximal end 40 and a distal blade attachment end 42 to which is secured to the top edges 24 of the blades 12, 14, 16 and 18. Blades 12, 14, 16 and 18 may be secured in any art known manner which is desired. Preferred manners of attachment are discussed in greater detail below. In the preferred form, the length of the handle 38 between its proximal end 40 and its distal attachment end 42 is approximately at least 8.5 inches long or longer. This minimum length is optimum and desired to prevent grease from the cooking surface from splattering onto the hand of a user grasping the handle 38. If the handle 38 is any shorter than approximately 8.5 inches, the user's hand will be too close to the blades 12, 14, 16 and 18 during meat separation during cooking, and thus will subject the user to burns from hot grease. While the length of the handle 38 may be greater than 8.5 inches, the optimum height of the device 10 from the proximal end 40 of the handle 38 to the bottom surface 26 of the blades 12–14 is preferably at least approximately 10 inches. Along with this arrangement the heights of the blades 12, 14, 16 and 18 are sufficient to allow them to cut fully into and through moist, fatty ground meat so as to prevent the portions of moist, fatty ground meat being cut from coming into contact with each other between the blades 12–14.

In its preferred form, as shown in FIGS. 1, 4, 6 and 7, the lower portion of each side edge 28 of each blade 12, 14, 16 and 18 and the outer portion of each bottom edge 26 of each blade 12–14 are preferably curved so as to form rounded corners 44. In that embodiment the angled surface 31 extends along the rounded corner 44 so as to enable the separation of moist, fatty ground meat in a frying pan having a rounded edges more effectively and efficiently, as discussed in greater detail below.

As previously noted, in order to maintain portions of moist, fatty ground meat which have been separated in fact separated from one another has been a problem. One of the reasons for those problems, as previously discussed, is that the separated portions become compressed or jammed in between the blades of the separating device. The arrangement of the present invention having four blades approximately 90° from each other assists in preventing that particular problem. However, an even more significant problem than the separation of moist, fatty ground meat during the process of cooking is the tendency of moist, fatty ground meat to come back together or re-agglomerate once the blades have been removed from the moist, fatty ground meat. Since moist, fatty ground meat is not a solid piece of meat to begin with, it has a tendency to agglomerate or stick together. Thus, simply pressing a blade between moist, fatty ground meat will not necessarily keep the moist, fatty ground meat in a separated form. Furthermore, the maintenance of this separation of the moist, fatty ground meat is especially important during the process of cooking. If the meat is not separated or re-agglomerates in part, and is separated and does not re-agglomerate in other parts, the meat cooks in a non-uniform manner. In some instances, the non-separated or re-agglomerated portions of the moist, fatty ground meat will be underdone. On the other hand, if the meat is sufficiently cooked so that the non-separated or re-agglomerated portions are completely cooked, those portions which are separated will be over cooked. Thus, because of its fat content and moisture, the tendency of moist, fatty ground meat to re-agglomerate when trying to separate it is a problem which has not been overcome prior to the present invention.

It has been determined by experimentation, as shown below, that in order to prevent the re-agglomeration of separated moist, fatty ground meat, the blades 12, 14, 16 and 18 must be at least 5/16 inch thick between their front surfaces 20 and their rear surfaces 22. This is a critical aspect of this invention. If the thickness of each of the blades 12, 14, 16 and 18 is less than about 5/16 inch, the moist, fatty ground meat, while being cooked, will not be sufficiently separated so as to remain segregated when the blades are removed, and will thus re-agglomerate. A preferred maximum width dimension of the blades 12, 14, 16 and 18 is approximately 3/8 inches in that anything wider than 3/8 inch becomes unnecessary and cumbersome to use. The angled surface 31 in combination with the width dimensions of at least 5/16 inch interact to enhance separation of moist, fatty ground meat and retain separation by preventing re-agglomeration. This problem is not recognized in any of the prior art and the solution provided by the present invention is certainly not suggested or even addressed since the problem is not recognized.

Referring now to FIGS. 1–4, the blades 12, 14, 16 and 18 are preferably formed as a single, solid piece. However, in the alternative, individual blades 12, 14, 16 and 18 may be connected at their inner side edges 30 by gluing or any other appropriate connection mechanism. On the other hand, the combined blades 12, 14, 16 and 18 may be created in a different manner. For example, referring to FIG. 4, a first separating member 46 is provided in the form of a generally elongated, substantial rectangular shaped member. The first separating member 46 includes a top edge 24, a bottom edge 26 and a slot 48 disposed at the mid-portion or centrally along the length thereof which extends approximately halfway into the member 46 while opening upwardly through the top edge 24. The slot 48 divides the first separating member 46 into separating blades 12 and 16 and defines the inner side edges 30 thereof. A second separating member 50 is sized and shaped substantially the same as the first separating member 46 and includes the top edge 24 and bottom edge 26. The second separating member includes a slot 52 also located centrally along the mid-line thereof but extends approximately halfway into the member 50 from the bottom edge 26 so as to open downwardly through the bottom edge 26. The slot 52 divides the second separating member 50 into the blades 14 and 18 and defines the inner side edges 30 thereof. Slots 48 and 52 are sized and shaped similar to each other and are designed so that the second separating member 50 is mounted onto the first separating member 46 with the slots 48 and 52 inter-engaging so as to define the X or cross pattern of the blades 12, 14, 16 and 18 as previously described. While top edge 24 is shown as being flat, in some preferred embodiments, not shown, the top edge is curved. Other means of joining blades 12, 14, 16 and 18 may be used, including forming the blades from a single piece of material. Similarly, while the preferred embodiments shown herein include four blades, it is well within the teaching of the present invention to use equivalent numbers of blades, say three, or five or more.

As also previously discussed, the handle 38 may be secured to the blades 12, 14, 16 and 18 at the flat or curved top edges 24 thereof in any desired manner. In the embodiment illustrated in FIG. 6 separating member 50 includes a shaft 54 which projects upwardly from the top edge 24 thereof at its mid-portion directly above slot 52. The blade attachment portion 42 of the handle 38 is hollow and is sized to receive the shaft 54 in a firm fitting relation so that the handle 38 may be attached to the second separating member by inserting the end 42 over the shaft 54. Once the second separating member 50 has been engaged with the first separating member 46 by interconnecting the slots 48 and 52 as previously described, the handle 38 is in a position to operate the entire device 10. However, in other preferred embodiments, not shown, the second separating member 50 and the handle 38 are integral with one another, and thereby seamlessly connected.

Figure 7:
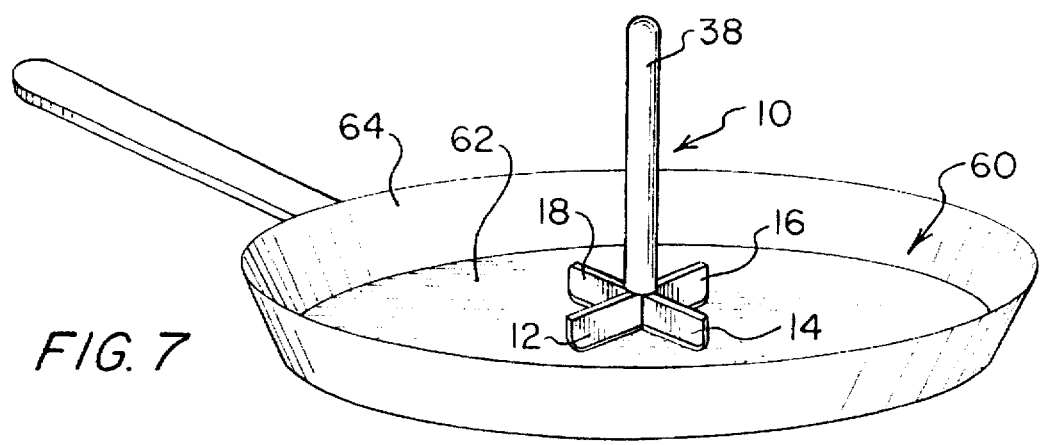
FIG. 7 is a schematic of the present invention in operational position within a frying pan.
Figure 6:
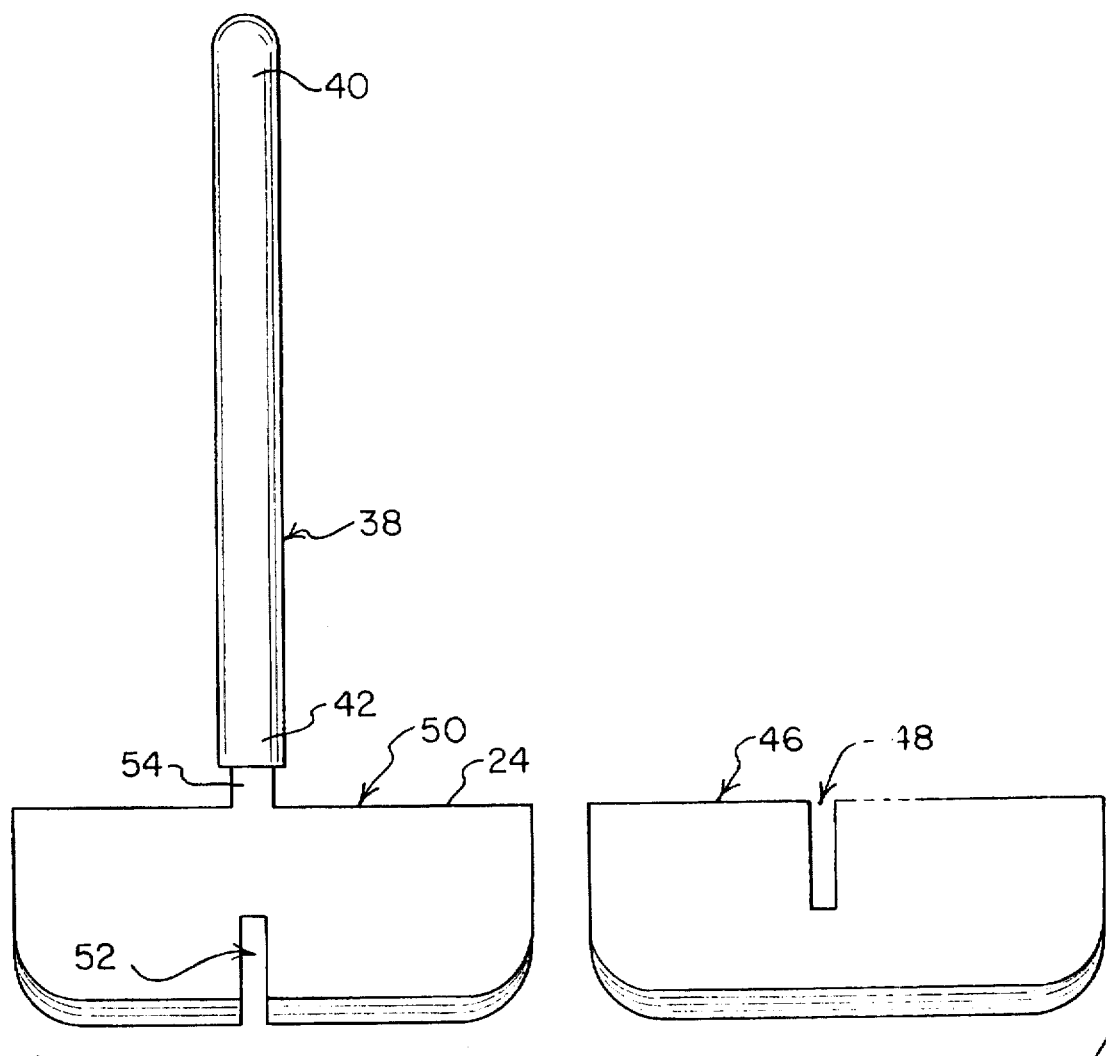
FIG. 6 is a schematic of yet another embodiment of the present invention with some components disassembled.
Figure 8:
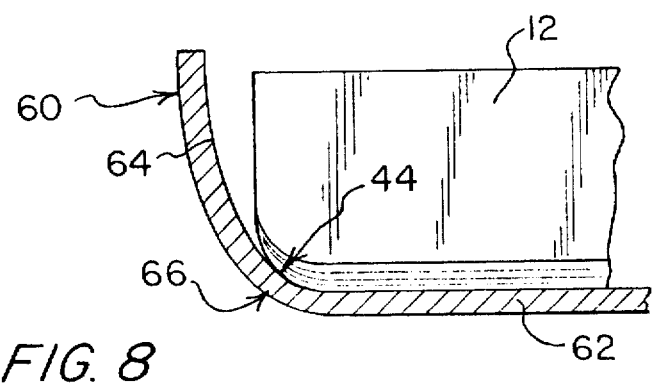
FIG. 8 is an enlarged schematic, with some parts in section, illustrating the blade engagement of the present invention with a corner of a frying pan.
Figure 9A:
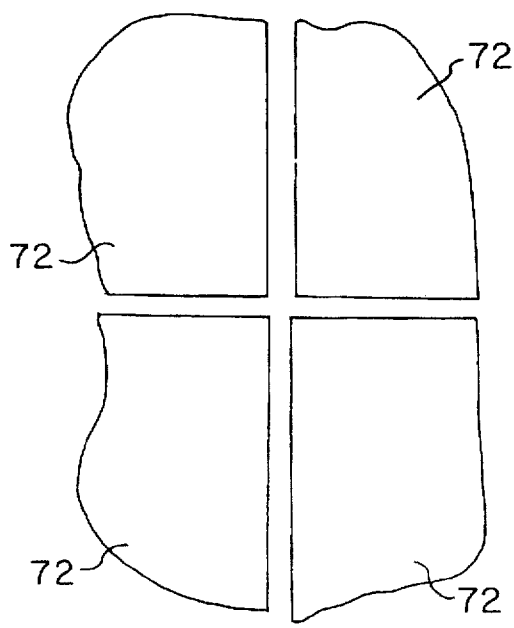
FIGS. 9a–9d are pictorial representations of the successive separation pattern that results from successive impacts of the device of the present invention against moist, fatty ground meat.
Figure 9B:
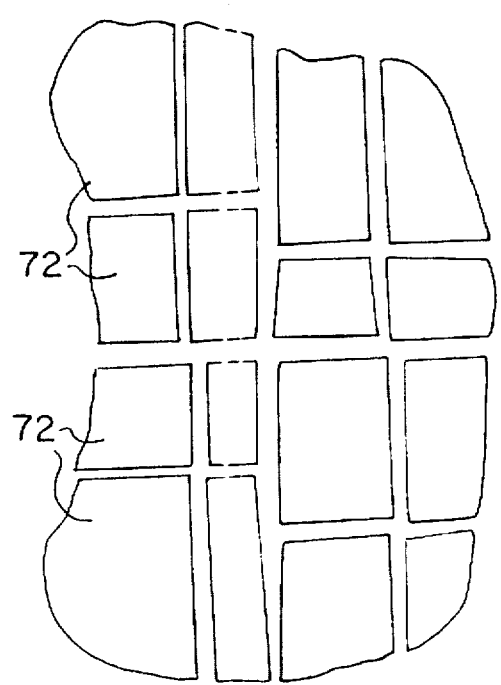
Figure 9C:
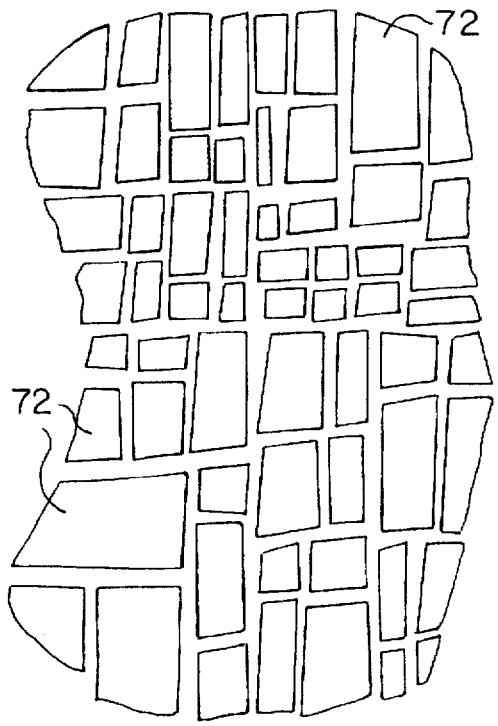
Figure 9D:
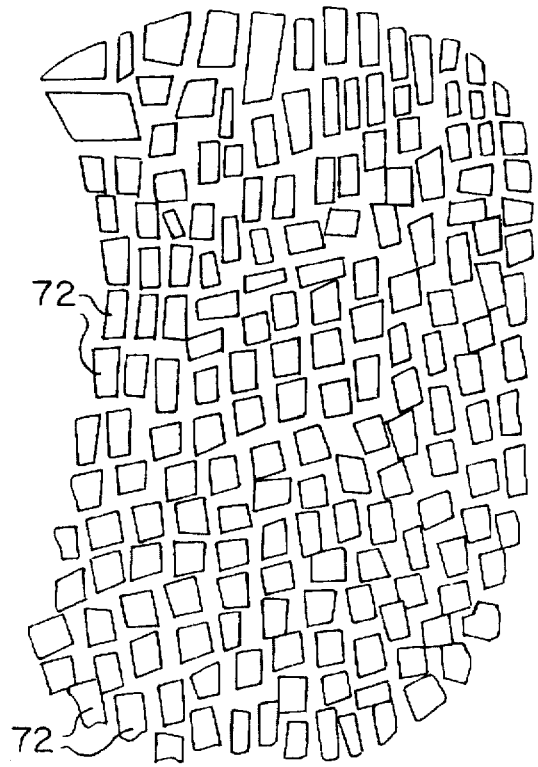

Referring particularly to FIGS. 7–9, the device 10 of the present invention is adapted and especially useful in the separating of moist, fatty ground meat while the meat is being cooked. Typically, moist, fatty ground meat is cooked in a frying pan 60 which frying pan generally includes a bottom 62 and an annular side member 64 which merges with the bottom 62 along a rounded corner 66. Therefore, any typical prior separating device is inefficient when used with a frying pan of such a construction in-as-much as blades having right angles at the ends thereof are unable to smoothly engage the rounded corner 66 of the frying pan 60. The present device 10, however, preferably includes the rounded corners 44 at the ends of each of the blades 12, 14, 16 and 18, and these rounded corners 44 also carry the angled surface 31 from the bottom edge 26 of each blade 12, 14, 16 and 18. Thus, as the device 10 is moved toward the edge of the frying pan 60 and engages the rounded corner 66 thereof, the rounded corners 44 and the angled edges 31 thereof are able to effectively and efficiently separate moist, fatty ground meat even at the rounded corner portion 66 of such a frying pan. Consequently, the device 10 of the present invention is especially useful and efficient when separating moist, fatty ground meat in frying pans of typical design. Moreover, blades without rounded corners 44 are worn down at the corners because of abrasion from the pan, whereas such is not the case with the present invention.

In operation a user places the moist, fatty ground meat 70 into the frying pan 62. The user then holds the device 10 by the handle 38 and successively strikes downward into the moist, fatty ground meat, separating the meat into smaller sections 72. This separating action is continued until the meat has been reduced to the portion sizes desired during the cooking process thereof. As illustrated by FIGS. 9a–9d, this continued separating action separates the moist, fatty ground meat 70 into gradually smaller portions 72. Moreover, due to the critical minimum thickness of 5/16 inch of the blades 12, 14, 16 and 18, the individual separated portions 72 do not tend to re-agglomerate and reattach to each other once the device 10 has been removed from the meat prior to the next downstroke of the device 10. Consequently, the moist, fatty ground meat 70 is gradually reduced to smaller and smaller portions 72 as it is being cooked. Moreover, as discussed above, the rounded corners 44 of the blades 12, 14, 16 and 18 are preferably approximately 1/4 inch up the outside edges 28 of the blades 12, 14, 16 and 18. This not only allows the device 10 to separate the meat against the rounded sides and corners of the frying pan, but also allows the blades 12, 14, 16 and 18 to perfectly match with the bottom of the frying pan 60 and thereby separate the moist, fatty ground meat 70 more efficiently.

The rounded edges 44 of the blades 12, 14, 16 and 18 also enable the blades 12, 14, 16 and 18 to follow the curvature of the frying pan bottom and corners when stirring or twirling the device 10 to blend in spices and/or seasonings or to bring the meat to the center of the frying pan 60 when separating it into very fine smaller pieces. In addition, blades 12, 14, 16 and 18 without the rounded edges 44, will tend to undergo excessive wear, or to damage the edges of the pan. As previously discussed, the blades 12, 14, 16 and 18 must have a critical minimum thickness of 5/16 inch in order to maintain separation of the moist, fatty ground meat having a high fat (27%) content. A test using ten different blades ranging in thickness from 1/32 to 5/16 of an inch proved that a minimum blade thickness of 5/16 inch must be used to keep high fat content moist, fatty ground meat from cooking back together and re-agglomerating after about four minutes.

EXAMPLE

Figure 10:
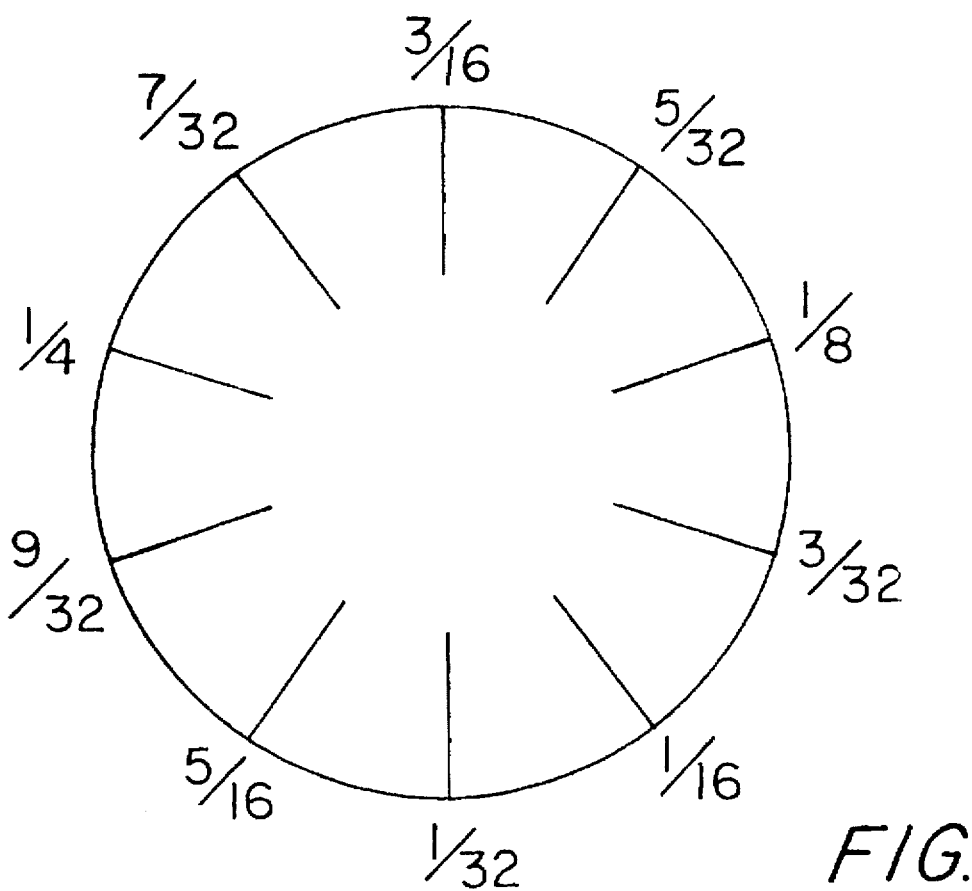
FIG. 10 is a schematic of a testing device utilized to determine minimum critical blade thickness for the present invention.

A test was conducted to establish the thickness of a blade required to separate moist, fatty ground beef without allowing it to stick back together when cooked in a skillet. Four grades of ground beef were used: 73% lean, 80% lean, 85% lean and 93% lean. A 10 inch round skillet was used on a 6 inch electric burner over constant medium heat. The four grades of moist, fatty ground beef were cooked one at a time. Approximately 1 pound of each grade was molded into a 6.5 inch round patty with minimum handling. Each large patty was approximately 1.25 inches thick, which is the way it is packaged in most grocery stores. Ten 2.5 inch×2.5 inch blades made of hard maple wood were used ranging in width from 1/32 inch to 5/16 inch. All blades had a 45° angled edge on the bottom separating edge, which previous tests had showed was the overall most efficient angle for separating moist, fatty ground meat. Ten blade separation cuts of varying thickness were made in the moist, fatty ground meat as shown in FIG. 10. The results of these tests are provided in Table I below, in which the horizontal axis is percent meat content (non-fat content), and the vertical axis is cooking time.

TABLE I

CHART OF RESULTS AT VARIOUS TIMES DURING COOKING

|  | 73% | 80% | 85% | 93% |
| --- | --- | --- | --- | --- |
| 4 minutes | Only 5/16 inch separation was slightly open | Only 9/32 inch and larger separations remained open | Only 1/4 inch and larger separations remained open | Only 7/32 inch and larger separation remained open |
| 9 minutes | Tried all blades again-only 1/4 inch and larger separations remained open | Tried all blades again-only 7/32 inch and larger separations remained open | Tried all wedges again-only 7/32 inch and larger separations remained open | Tried all blades again-only 3/16 inch and larger separations remained open |
| 15 minutes |  |  | Poured off grease | Only 3/16 inch and larger remained cleanly separated |
| 16 minutes |  | Poured off grease |  | (Not enough grease to pour off) |
| 17 minutes |  |  | Only 3/16 inch and larger remained cleanly separated |  |
| 18 minutes | Poured off grease |  |  |  |
| 19 minutes |  | Only 3/16 inch and larger remained cleaned separated |  |  |
| 22 minutes | Only 3/16 inch and larger remained cleanly separated |  |  |  |

The results of these tests showed that the moist, fatty ground beef, and all other moist, fatty ground meats, will cook faster when separated into segments. This is due to the fact that smaller, separated segments of meat have relatively more total surface area exposed to heat for their size than do larger pieces or larger segments of meat. Tests have previously been conducted showing that moist, fatty ground meat will cook 15% to 25% faster, depending on fat content, when it is segmented at the beginning of cooking and 3 to 4 minutes after cooking starts. The tests conducted above show that, in order to keep moist, fatty ground meat segments separated when starting to cook, a minimum blade thickness of 5/16 inch is necessary for 73% lean meat and a minimum thickness of 7/32 inch is necessary for 93% lean moist, fatty ground meat. Thus, since a device is likely to be used with a variety of meats, 5/16 inch is minimum to provide the desired result regardless of the fat content of the meat used.

As can be seen from the above, the meat separating device of the present invention is a highly effective device in accomplishing the separation of moist, fatty ground meat during its cooking. It very efficiently separates moist, fatty ground meat and keeps it separated so as to thoroughly cook the meat throughout without over cooking some portions or under cooking other portions. This even cooking of moist, fatty ground meat is due to the even separation which in turn results from the lack of re-agglomeration of the moist, fatty ground meat portions after they have been separated. A critical factor in the operation of the present invention and in its unusually effective results is the fact that the blades of the device must be at least 5/16 inch thick. As the tests above indicate, anything less than 5/16 inch thick blades will not effectively separate the moist, fatty ground meat and will therefore inefficiently cook it. Since the device is intended to be used for all sorts of moist, fatty ground meat of a wide variety of fat content, the device must have blades with a minimum thickness of 5/16 inch in order to effectively work on all types of moist, fatty ground meat regardless of whether it is beef and regardless of its fat content. The curved corners and angled cutting edges of the device also assist substantially in the operation of the device, and the device is designed to prevent burns to the hands of the user resulting from splashing of hot grease. Thus, the device of the present invention is a highly effective tool for its limited purpose of separating moist, fatty ground meat while being cooked in a frying pan environment.

The foregoing description and the illustrative embodiments of the present invention have been shown in the drawings and described in detailed in varying modifications and altering embodiments. It should understood, however, that the foregoing description of the invention is exemplary only, in that the scope of the invention is to be limited only to the claims as interpreted in view of the prior art. Moreover, the invention illustratively disclosed herein suitably may be practiced in the absence of any embodiment which is not specifically disclosed herein.

I claim:

1. A hand-operated device for separating and maintaining separation of moist, fatty ground meat while the meat is being cooked on a heated cooking surface, said device comprising:

an elongated handle having a distal blade attachment end and a proximal free end, the length of said handle between said proximal end and said distal blade attachment end being adapted to substantially prevent grease from the heated cooking surface from splattering onto the hand of a user grasping said handle;

four non-metallic separating blades, each separating blade having substantially parallel front and rear surfaces bounded by an inner side edge, an outer side edge, a top edge and a bottom edge, said bottom edge being in the form of an angled surface, said four blades being oriented at approximately right angles to each other to form a cross pattern, each said blade being at least 5/16 inch thick between said blade front and rear surfaces to ensure separation of said moist, fatty ground meat as each said blade passes entirely through any such cooking ground meat and to prevent re-agglomeration of the separated moist, fatty ground meat as said blade is removed therefrom; and means for connecting said blade attachment end of said handle to said top edges of said blades proximate said intersection of said inner side edges thereof; whereby, when said hand-operated device is used to separate moist, fatty ground meat while the meat is being cooked on a heated cooking surface, said separated moist, fatty ground meat remaining substantially separated.

2. Said device as claimed in claim 1, wherein said lower portion of said outer side edge and said outer portion of said bottom edge of each said blade is curved to form a rounded lower outer corner for each said blade.

3. Said device as claimed in claim 2, wherein said angled surface of each said blade extends along said rounded corner from said bottom edge of said blade.

4. Said device as claimed in claim 1, wherein said angled surface is formed from two planar surfaces projecting downwardly from said front and said rear surfaces, respectively, of each said blade at approximately 45° to said front and said rear surfaces to meet at an approximately 90° angle to form a knife edge.

5. Said device as claimed in claim 1, wherein said elongated handle is at least 8.5 inches between said proximal end and said distal blade attachment end, thereby substantially preventing grease from the heated cooking surface from splattering onto the hand of a user grasping said handle.

6. Said device as claimed in claim 1, wherein said device further includes a first elongated separating member having an upward oriented slot disposed about mid-way along said length thereof to define two of said blades, and a second elongated separating member having a downward oriented slot disposed about mid-way along said length thereof to define an additional two of said blades, said slot of said second elongate separating member being adapted for interconnection with said slot of said first elongated separating member to form said four blades aligned at approximately right angles relative to its adjacent blades.

7. Said device as claimed in claim 6, wherein said blade attachment end of said handle is secured to said top edge of said second elongated separating member proximate said mid-portion of said top edge of said second elongated separating member.

8. A process for separating moist, fatty ground meat while being cooked on a heated cooking surface, said process comprising said steps of:

pressing four non-metallic meat separating blades connected to a single handle and oriented at approximately right angles to each other in a cross pattern, through said cooking moist, fatty ground meat to separate said meat, each said blade being at least 5/16 inch in thickness and having an angled bottom edge surface;

removing said blades from said cooking, moist, fatty ground meat utilizing said handle, said thickness of said blades being sufficient to prevent re-agglomeration of said separated moist, fatty ground meat; and repeatedly reorienting said blades to a different position over said meat, pressing said blades into said moist, fatty ground meat and removing said blades from said meat to progressively separate said moist, fatty ground meat into successively smaller pieces as it cooks without said meat re-agglomerating into larger pieces, whereby, said separated moist, fatty ground meat remains substantially separated.

9. Said process of claim 8, wherein said cooking surface is selected to be a pan having rounded inner corners, and wherein further each said blade includes a rounded outer, lower corner with said angled surface extending over said edge of said blade rounded corner enhances separation of said meat in such a pan.

10. Said process of claim 8, wherein said handle is at least about 8½ inches in height above said blades to thereby substantially prevent grease from the heated cooking surface from splattering onto the hand of a user grasping said handle.

11. A hand-operated device for separating moist, fatty ground meat while said meat is being cooked on a heated cooking surface, comprising:

- a first non-metallic elongated separating member having a top edge, a bottom edge, two end edges and a slot disposed substantially centrally along said length thereof between said end edges and opening upwardly at said top edge, said bottom edge being in the form of an angled surface;
- a second elongated separating member having a top edge, a bottom edge, two end edges and a slot disposed substantially centrally along said length thereof between said end edges and opening downwardly at said bottom edge, said bottom edge being in the form of an angled surface;
- said slots being sized and shaped to engage and connect said first and second separating members at approximately right angles to one another to form four separating blades in a cross pattern, said separating members being at least 5/16 inch thick; and
- a handle having a proximal free end and a distal blade attachment end for attachment to said top edges at said juncture of said slots, the length of said handle being adapted to substantially prevent grease from the heated cooking surface from splattering onto the hand of a user grasping said handle.

12. A device as claimed in claim 11, wherein said lower portions of said end edges and said outer portions of said bottom edges of said first and second separating members form rounded lower, outer corners for each said blade.

13. Said device as claimed in claim 12, wherein said angled surface of each said separating member extends along said rounded corners from said bottom edges of said separating member.

14. Said device as claimed in claim 11, wherein said handle is at least about 8.5 inches between said proximal free end and said distal blade attachment end.

15. Said device as claimed in claim 14, wherein said device has a height of at least ten inches between said proximal free end and said distal blade attachment end.

16. Said device as claimed in claim 11, wherein said blade attachment end of said handle is secured to said top edge of said second elongated separating member proximate said mid-portion thereof.

17. Said device as claimed in claim 11, wherein said blade attachment end of said handle is integral with and seamlessly connected to said top edge of said second elongated separating member proximate said mid-portion thereof.

18. A hand-operated device for separating and maintaining separation of moist, fatty ground meat while the meat is being cooked on a heated cooking surface, said device comprising:

- an elongated handle having a distal blade attachment end and a proximal free end, the length of said handle between said proximal end and said distal blade attachment end being adapted to substantially prevent grease from the heated cooking surface from splattering onto the hand of a user grasping said handle;
- four non-metallic separating blades, each separating blade having substantially parallel front and rear surfaces bounded by an inner side edge, an outer side edge, a top edge and a bottom edge, said bottom edge being in the form of an angled surface, said four blades being oriented at approximately right angles to each other to form a cross pattern, each said blade being at least 5/16 inch thick between said blade front and rear surfaces to ensure separation of said moist, fatty ground meat as each said blade passes entirely through any such cooking ground meat and to prevent re-agglomeration of the separated moist, fatty ground meat as said blade is removed therefrom, and wherein further said lower portion of said outer side edge and said outer portion of said bottom edge of each said blade is curved to form a rounded lower outer corner for each said blade; and
- means for connecting said blade attachment end of said handle to said top edges of said blades proximate said intersection of said inner side edges thereof; whereby, when said hand-operated device is used to separate moist, fatty ground meat while the meat is being cooked on a heated cooking surface, said separated moist, fatty ground meat remains substantially separated.

* * * * *